United States Patent [19]
DiGiovanni et al.

[11] Patent Number: 5,868,815
[45] Date of Patent: Feb. 9, 1999

[54] METHOD OF MAKING AN OPTICAL FIBER BY BLOWING ON A PREFORM TUBE TO ENHANCE COLLAPSE

[75] Inventors: David John DiGiovanni, Montclair, N.J.; Steven Alan Jacobs, Atlanta, Ga.; Man Fei Yan, Berkeley Heights, N.J.

[73] Assignee: Lucent Technologies Inc., Murray Hill, N.J.

[21] Appl. No.: 803,476

[22] Filed: Feb. 20, 1997

[51] Int. Cl.$^6$ ................................................ C03B 37/07
[52] U.S. Cl. .................... 65/382; 65/428; 65/491
[58] Field of Search ............... 65/382, 377, 428, 65/419, 374, 491

[56] References Cited

U.S. PATENT DOCUMENTS

| | | | |
|---|---|---|---|
| 5,160,520 | 11/1992 | Keim | 65/419 |
| 5,318,612 | 6/1994 | Le Noane | 65/419 |

FOREIGN PATENT DOCUMENTS

| | | | |
|---|---|---|---|
| 60-260439 | 12/1985 | Japan | 65/428 |

*Primary Examiner*—John Hoffmann

[57] ABSTRACT

The specification describes a process and apparatus for monitoring and controlling the ellipticity of preform tubes during Modified Chemical Vapor Deposition. In response to computer generated signals from the monitoring device, the tube collapse rate is adjusted dynamically by locally changing the temperature of the glass tube, or by changing the physical force acting to collapse the tube.

6 Claims, 2 Drawing Sheets

METHOD OF MAKING AN OPTICAL FIBER BY BLOWING ON A PREFORM TUBE TO ENHANCE COLLAPSE

FIELD OF THE INVENTION

This invention relates to optical fiber manufacture and more specifically to improved preform fabrication techniques.

BACKGROUND OF THE INVENTION

The manufacture of optical fiber typically uses one of two fundamental approaches. Both use rotating lathes, and accumulate pure glass material on a rotating preform by chemical vapor deposition or a modification thereof. The earliest technique deposited material on the outside of a rotating preform, and the preform usually started as a hollow tube with a slowly increasing diameter as the vapor deposited glass material accumulated on the outside of the solid tube. A significant advance in this technology occurred with the introduction of the so-called Modified Chemical Vapor Deposition (MCVD) process of MacChesney et al in which the glass forming precursers were introduced into a rotating hollow tube and the glass material was deposited on the inside wall of the hollow tube. In this way exceptionally pure material could be produced at the critical core region. It also allowed better control over the reaction environment.

The MCVD technique has evolved to a highly sophisticated manufacturing technique and is widely used in commercial practice today.

However, a basic technological problem inherent with the use of a hollow tube, a problem that has persisted since the discovery of the MCVD technique, is that of ensuring the circularity of the tube throughout the deposition process. It is an inherent thermodynamic condition of the process that the temperatures used during consolidation and collapse of the glass tube exceed the softening temperature of the initial glass tube so that throughout the process the tube itself is vulnerable to deformation. Typically such deformation results in small changes in the circular cross section of the tube producing tube ovality, and the tube is most susceptible to such changes during the tube collapse operation.

It has also been a challenge to provide tubes initially with a consistent circular profile along the full length of the tube. A successful technique that is capable of eliminating departures in tube circularity during the collapse process could also be effective in eliminating ovality in starting tubes by a predeposition treatment in which the torch is passed at elevated temperatures down the lathe to adjust the circularity of the starting tube.

To attempt to avoid ovality problems developing during tube collapse it has been customary in the technology to collapse the tube slowly, using multiple passes of the torch. The objective is to shrink the diameter in small increments so that the surface tension of the glass, which tends to preserve circularity, can be close to equilibrium and can offset other forces, e.g. gravity, that tend to produce ovality. However, in current manufacture the collapse process is undesirably long, typically consuming nearly half the manufacturing time. Thus an important objective in the MCVD art is to reduce tube collapse time. Techniques that allow better control over the ovality problem also allow more aggressive tube collapse schedules, which in turn substantially reduce the costs of preform manufacture.

A known prior art technique for controlling or eliminating ovality problems during the MCVD process is to maintain a positive pressure of an inert gas, e.g. nitrogen or argon, in the tube especially during collapse of the tube. If the initial tube is circular a uniform hydrostatic pressure inside the tube theoretically will equalize the surface tension of the collapsing glass both along the length of the tube and around the circumference of the tube to maintain uniform collapsing forces throughout the tube. While this approach has been successful in addressing the ovality problem, the use of internal pressure in the tube actually reduces the collapse rate. Techniques for reducing the duration of the tube collapse step while preventing tube ovality continue is a major goal of MCVD process designers.

SUMMARY OF THE INVENTION

We have developed a technique for ensuring tube circularity during MCVD processing. It relies on precise monitoring of the external tube circularity using a computerized system to detect the presence or onset of tube ovality. In response to a detection of ovality by the monitor, the tube profile is corrected using externally applied gas pressure localized to the region of ovality. It has been found that the use of the automated system for maintaining tube circularity during collapse according to the invention allows more aggressive collapse techniques to be used, resulting in substantial decrease in collapse times. To further reduce collapse times, a vacuum or a negative pressure relative to the external ambient may be introduced in the tube during the collapse process.

DETAILED DESCRIPTION

To develop an improved tube collapse process it is necessary to first understand the thermodynamics of the process, including the major driving forces acting on the glass tube during collapse. The forces, $\sigma$, of the tube collapse process are due to the surface tension, $\gamma$, of glass and pressure difference between the outside, $P_b$, and inside $P_a$, of the tube. A smaller driving force for collapse is exerted by oxygen and hydrogen fuels, $P_F$, from the torch impinging on the external tube surface. The centrifugal force due to tube rotation imposes a relatively small force to hinder the collapse process. The net force to collapse a tube, having outside and inside radii of R and r respectively, is given as:

$$\sigma = \frac{\gamma}{R} + \frac{\gamma}{r} + (P_b - P_a) + P_F - 2\pi^2(R + r)n^2\rho_A$$

where the last term in this equation represents the centrifugal force resulting from tube rotation at n rotations per second and $\rho_A$ is the mass of glass tubing per unit surface area. The surface tension and the flame pressure induce a positive pressure to collapse or reduce the tube radius. The tube rotation introduces a centrifugal force to oppose tube collapse. The applied internal pressure, mentioned above, can prevent collapse and it can even expand the tube.

The collapse velocity, dR/dt, depends on both the driving force and the glass viscosity. It can be shown that:

$$\frac{dR}{dt} = -\frac{1}{4R} \frac{\frac{\gamma}{R} + \frac{\gamma}{r} + (P_b - P_a) + P_F - 2\pi^2(R+r)n^2\rho_A}{\int_r^R \frac{\eta(x)dx}{x^3}}$$

where a radial variation of viscosity, $\eta(x)$, is included in this equation. It is obvious that the collapse velocity increases when the glass is less viscous at higher temperatures.

During the collapse operation, the ellipticity in the starting tube can be magnified to a significant magnitude. This will cause an elliptical fiber core and introduce polarization mode dispersion (PMD) which is deleterious for many fiber applications. Analysis and experiment show that an ellipticity in the starting tube will magnify during collapse when the outside pressure, Pb, exceeds the inside pressure, Pa, by a critical value. The critical pressure depends on the tube dimensions. For example, as a 19×25 mm diameter (19 inside, 25 outside) homogeneous tube is collapsed to 22 mm outside diameter, the ellipticity will grow if the pressure difference (Pb−Pa) is more than 0.032 inch of water. A higher pressure difference of 0.28 inch of water can be tolerated without ellipticity when the tube is shrunk to an outside diameter of 17.2 mm. In practice, the pressure inside the tube is generally maintained at a higher value than the outside ambient, i.e. Pb−Pa<0. This internal pressurization preserves the circular tube geometry, but as indicated earlier, does so at the expense of a slower collapse rate.

Figure 1:
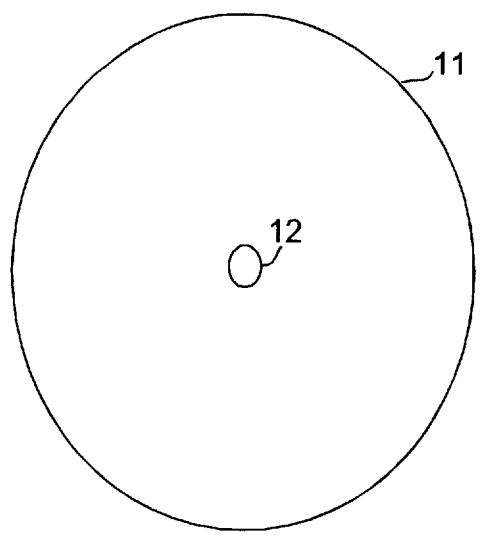
FIG. 1 is a schematic representation of a preform geometry illustrating the objective of the process of the invention.

As just indicated ellipticity in the starting tube translates directly into ellipticity in the collapsed preform. It also translates directly to ellipticity in the core of the preform as illustrated in FIG. 1. With reference to FIG. 1 there is shown a cross section of a preform 11 with an elliptical shape, and the corresponding elliptically shaped core 12. The ratio of the core diameter to the preform diameter for a typical single mode fiber is in the range 1/10 to 1/20. The shape of the core cross section is nearly a replica of the shape of the overall preform and shows the unacceptable ellipticity in the core 12.

Among the problems created by excess core ellipticity are unwanted polarization-mode dispersion (PMD) and excessive splice loss. Whereas an ideal circularly symmetric single-mode fiber supports two independent, degenerate modes of orthogonal polarization, an excess core ellipticity breaks the circular symmetry and removes the degeneracy of the two polarization modes. These two modes propagate with different phase velocities and thus a birefringence is introduced into the fiber. Furthermore, the output state of polarization is both unpredictable and unstable as a result of thermal and mode-coupling effects. On average, the output state of polarization varies cyclically along the fiber with a certain polarization "beat" length. Thus, the core ellipticity-induced birefringence results in a signal polarization-mode dispersion which is typically undesirable, especially for applications that involve high bit rate or analog transmission. See e.g., U.S. Pat. No. 5,418,881 and Applied Optics, Vol.20 (17) 2962.

Figure 2:
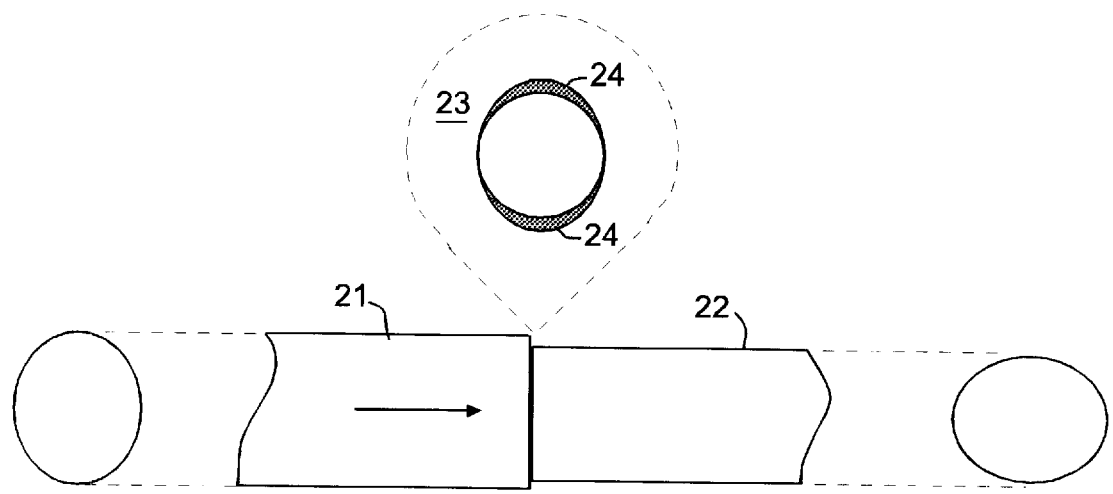
FIG. 2 is a schematic diagram showing losses at a fiber splice as a consequence of tube ovality as shown in FIG. 1.

FIG. 2 illustrates the other negative consequence of excessive ellipticity in the fiber core that was mentioned above, i.e. excessive splice loss. This problem arises when lengths of the defective fiber are spliced together. In the manufacture and repair of lightwave systems the circular orientation of the fiber is random in a typical splice since the fiber cross section is normally circular. If the fiber has excessive ellipticity, the mode field distribution of the propagating beam will be non-circular. When the fiber ends 21 and 22 are oriented as shown in FIG. 2, the cross section of the splice appears as shown at 23, and the energy in the propagating beam that falls within the shaded areas 24 is lost.

The analysis and background presented above aids in understanding the problem, and the solution of the problem according to the invention, i.e. by monitoring the tube geometry during processing, and selectively modulating process conditions according to the monitoring data. The process conditions that are modulated are e.g. the thermal output of the torch, or the selective local application of outside pressure. Use of locally applied pressure is the preferred mechanism for correcting tube ovality.

Although the use of inside pressure as taught in the prior art slows the potential collapse rate, we have recognized that by using externally applied pressure, locally and selectively applied during preform collapse, ellipticity can be controlled effectively and the collapse rate increased.

Figure 3:
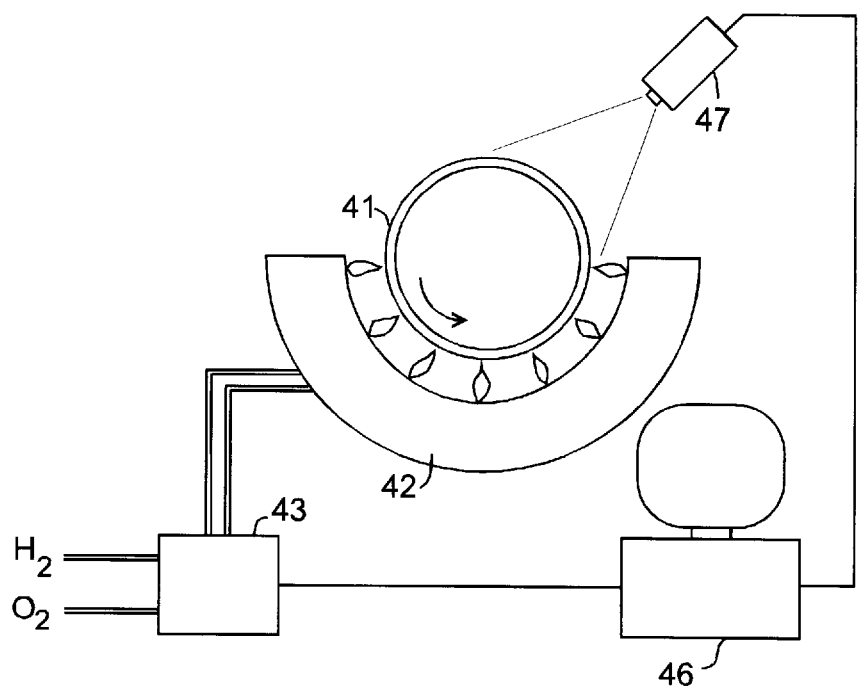
FIGS. 3 and 4 are schematic representations of preform manufacturing apparatus using the principles of the invention.

The techniques for reducing or eliminating unwanted ellipticity according to the invention are described in connection with FIGS. 3 and 4. The basic MCVD process is well known, as is the equipment used in the process. See for example, J. B. MacChesney et al, "Preparation of Low Loss Optical Fibers Using Simultaneous Vapor Phase Deposition and Fusion", Xth Int. Congress on Glass, Kyoto, Japan (1973) 6–40. As seen in FIG. 3, the silica tube 41 is mounted for rotation in an MCVD glass lathe (not shown). Glass precursor gases, e.g. $SiCl_4$, $GeCl_4$, $O_2$, are passed down the rotating tube while the tube is heated with an oxy-hydrogen torch 42. When deposition and consolidation are complete the tube is collapsed by known techniques, i.e. heating the tube to well above the glass softening temperature, i.e. >2000°–2400° C. to allow the surface tension of the glass tube to slowly shrink the tube diameter, finally resulting, after multiple passes of the torch, in the desired solid preform. Since the glass is well above the softening temperature during collapse, tube ovality is most likely to develop during this operation.

The temperature of the torch is controlled by the ratio of hydrogen to oxygen, and their absolute flow rates in the fuel mixture supplied to the torch. The gas flow control, shown at 43 in FIG. 3, controls the flow rate of $H_2$ and $O_2$ independently, and thus the ratio of hydrogen to oxygen, and the resulting metered gas streams are supplied to the torch 42. The gases are mixed at the flame according to well known techniques.

According to the invention feedback control during collapse is used to maintain circular tube geometry. Measurements of tube dimensions are made during tube rotation to provide an input for the geometry control apparatus. In a first embodiment, shown in FIG. 3, these measurements are fed to gas flow control 43 to modify the tube geometry.

In this embodiment of the invention the spatial or azimuthal temperature distribution around the tube is used to modulate the collapse rate along the tube circumference. The azimuthal temperature distribution introduces a similar distribution profile in glass viscosity. During tube shrinkage, the circularity of the tube can be maintained by selectively heating any tube portion that has or develops a larger radius than the average value. With otherwise equivalent dynamic forces contributing to tube shrinkage, a higher collapse rate occurs in the region that is less viscous, i.e. more intensely heated. This method of preferentially shrinking the tube region that bulges from the median circumference provides the feedback mechanism that allows control over tube ellipticity.

Referring again to FIG. 3, a commercial laser micrometer 47 (available from e.g. Keyence) is used to measure tube diameters at different azimuthal angles during tube rotation.

Other monitoring devices, e.g. video cameras, can be used to record the geometrical measurements. These measurements are fed to a microprocessor 46 which calculates the tube geometry and ovality. The geometrical input data is then processed by the same or another microprocessor to develop commands to operate the gas flow control 43. The operation of the gas flow control 43 varies the temperature of the torch 42 in a controlled manner to dynamically change the tube shape.

Another embodiment of the invention will be described in connection with FIG. 4, which shows the rotating tube 51 heated by torch 52. The torch is fed by fuel supply 58. In this embodiment an external pressure pulse supplied by gas nozzle 53 is used to modulate azimuthally the collapse force along the circumference of the tube. The tube geometry monitoring device 57 is operated as described above to feed geometry signals to computer 56 which develops tube geometry correction signals that operate the gas flow control device 55. The gas source shown at 54 may be air, or an inert gas such as nitrogen, argon or other suitable gas.

The force applied by nozzle 53 to control the tube geometry during collapse can be positive or negative. In the latter case a vacuum source (not shown) is connected to nozzle 53 and the vacuum controlled by flow control 55 to apply the negative pressure called for by the computer control 56. In each case the pressure refers to a pressure created locally at the tube surface that is respectively higher or lower than the pressure of the ambient.

In the case of the positive pressure, the pulses are controlled to apply pressure selectively on the surface portion when the monitoring device detects a tube radius that is larger than the average value. In the case of a negative pressure, the pressure pulse is applied selectively to a surface portion of the tube that has a tube diameter less than desired. The negative pressure pulse can be produced in at least two ways; by directing a gas stream tangentially to the tube circumference to generate a negative pressure at the tube surface according to well known Bernouli principles, or a vacuum can be used as earlier described.

Figure 4:
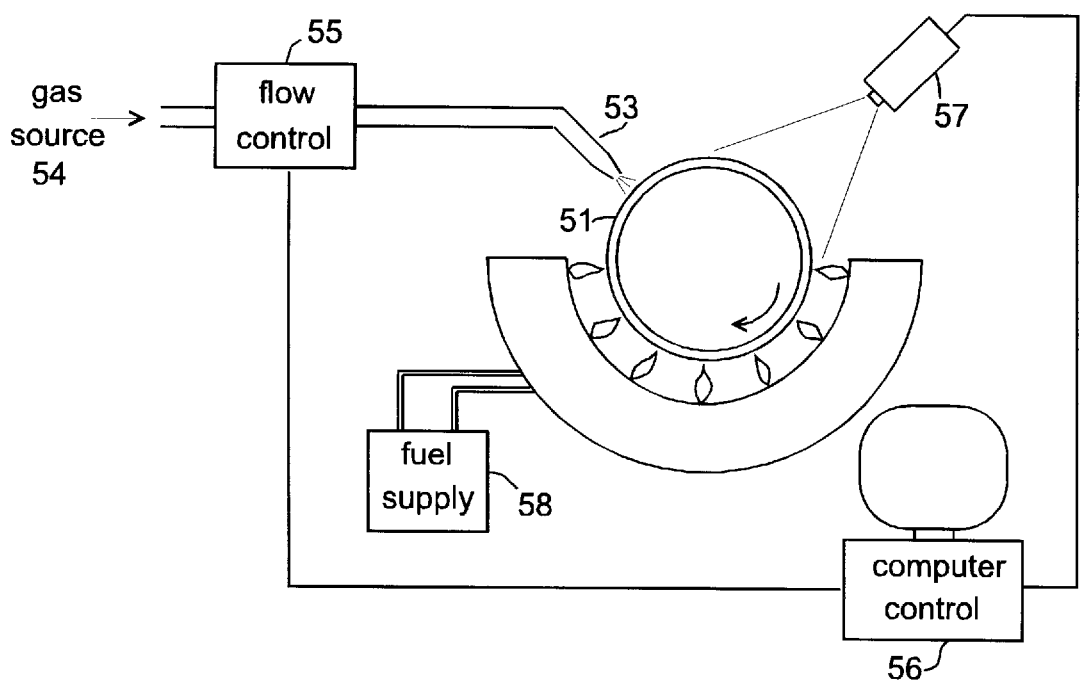

While FIG. 4 shows a single gas nozzle or jet 53, multiple nozzles can be used and placed at other locations around the tube diameter. With the torch arranged as shown and the tube rotation in the direction indicated, the viscosity of the glass may be slightly higher on the side where the nozzle 53 is located which may be an advantageous arrangement. Alternatively the positions of monitor 57 and the nozzle 53 may be reversed, or other effective arrangements may occur to those skilled in the art. One or more gas jets may also be incorporated into the torch assembly 52. The air or gas supplied to nozzle 53 is preferably preheated by a heater (not shown) to prevent excessive cooling of the tube.

The foregoing example describes using pressure pulses from the nozzle 53 of FIG. 4 to change the force that controls the collapse rate of the tube. Alternatively, the gas nozzle arrangement of FIG. 4 can be used in a manner similar to that described in connection with FIG. 3 to locally control the temperature of the glass tube. If the air or other gas from source 54 is at room temperature, or is at least substantially less than the softening temperature of the glass tube, the application of the cool gas from the nozzle 55 will locally change the glass viscosity of the tube and slow the collapse rate according to the principles described in connection with the embodiment of FIG. 3.

While the use of externally modulated gas pressure is effective and is a preferred embodiment of the invention, the development of an effective tube circularity monitoring and feedback system, as described here, allows the process designer to use internally modulated pressure, i.e. inside the tube, to achieve the objectives of the invention. To implement this embodiment the nozzle 53 is simply placed inside the rotating tube. The rotating tube does not have a uniform temperature along its circumference. In fact, the hottest spot on a rotating tube is located away from the torch because it takes time for thermal diffusion through the tube wall. The tube geometry is monitored by the monitoring means described above to determine whether the tube ellipticity requires expanding or shrinking the tube locally where the hottest spot exists. The feedback arrangement of FIG. 4 then adjusts the internal pressure of the tube to restore tube circularity. Because the hottest spot of the tube has the lowest viscosity it is most susceptible to the internally applied pressure.

It is also possible to use the gas flow apparatus of FIG. 4 to heat the tube locally. However, the gas temperatures required to do this effectively are so high that it is more practical to control the process as described in the foregoing examples.

Although the process as described here uses a flame torch and a fuel of mixed oxygen and hydrogen, plasma torches using, for example, a microwave plasma ring, are also used in these kinds of processes. In such a process the temperature can be modulated although the dynamic rate of modulation may be different than in the case of a flame torch. Also gas torches other than oxy-hydrogen torches can be used. The process of the invention in one embodiment requires modulating the temperature of the heat source whatever the heat source used.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for the manufacture of optical fiber comprising the steps of:

a. Flowing glass precursors through a heated glass preform tube to deposit glass material on the inside of the tube, b. applying a heat source to the tube to heat the tube to above its softening temperature while rotating the tube to collapse the tube and thereby form a solid preform, c. drawing said solid preform into an optical fiber, wherein the improvement comprises carrying out step b. using the steps of:

i. continuously monitoring the rotating tube during said collapse of the tube to generate measurements of the tube, ii. directing a flow of gas onto a localized region of the rotating tube, said flow of gas having a flow rate r, and iii. varying said flow rate r in response to said measurements from monitoring step i.

2. The method of claim 1 in which the gas is selected from the group consisting of air, nitrogen, argon and mixtures thereof.

3. The method of claim 1 including the step of heating the gas to above room temperature prior to step ii.

4. The method of claim 1 including the step of cooling the gas to below room temperature prior to step ii.

5. The method of claim 1 in which the gas is at approximately room temperature.

6. The method of claim 1 in which a laser micrometer apparatus is used for step i.

\* \* \* \* \*